(12) United States Patent
Kobayashi et al.

(10) Patent No.: US 9,091,768 B2
(45) Date of Patent: Jul. 28, 2015

(54) SCINTILLATOR MATERIAL AND RADIATION DETECTOR USING SAME

(75) Inventors: Tamaki Kobayashi, Isehara (JP); Ryoko Ueyama, Kawasaki (JP); Toru Den, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/118,512

(22) PCT Filed: Jun. 6, 2012

(86) PCT No.: PCT/JP2012/065065
§ 371 (c)(1),
(2), (4) Date: Nov. 18, 2013

(87) PCT Pub. No.: WO2012/169659
PCT Pub. Date: Dec. 13, 2012

(65) Prior Publication Data
US 2014/0264044 A1    Sep. 18, 2014

(30) Foreign Application Priority Data

Jun. 6, 2011    (JP) .................................. 2011-126263

(51) Int. Cl.
*G01T 1/202* (2006.01)
*C09K 11/62* (2006.01)
*C04B 35/515* (2006.01)
*C04B 35/653* (2006.01)
(Continued)

(52) U.S. Cl.
CPC ........... *G01T 1/2023* (2013.01); *C04B 35/5152* (2013.01); *C04B 35/653* (2013.01); *C09K 11/616* (2013.01); *C09K 11/625* (2013.01); *G01T 1/2006* (2013.01); *C04B 2235/32* (2013.01); *C04B 2235/3201* (2013.01); *C04B 2235/3281* (2013.01); *C04B 2235/3286* (2013.01)

(58) Field of Classification Search
CPC ... G01T 1/2006; G01T 1/2023; C09K 11/616
USPC ......................................................... 250/366
See application file for complete search history.

(56) References Cited

U.S. PATENT DOCUMENTS 5,028,509 A     7/1991   Shimada et al.
5,876,630 A *   3/1999   Vinograd et al. ...... 252/301.4 H
(Continued)

FOREIGN PATENT DOCUMENTS

EP    0 252 991 B1    4/1991
JP    2003-147343 A   5/2003
JP    2007-205970 A   8/2007

OTHER PUBLICATIONS

S. Hull et al., "Cristal Structures and Ionic Conductivities of Ternary Derivatives of the Silver and Copper Monohalides-II: Ordered Phases Within the (AgX)x-(MX)1-x and (CuX)x-(MX)1-x (M=K, Rb and Cs; X=Cl, Br and I) Systems," 177 (9) Journal of Solid State Chemistry 3156-3173 (Jul. 2004) (XP004537292).

*Primary Examiner* — Marcus Taningco
(74) *Attorney, Agent, or Firm* — Fitzpatrick, Cella, Harper & Scinto (57) ABSTRACT

Improvement in luminescence intensity is demanded from a scintillator material. The present invention provides a new scintillator material by adding a specific element selected from thallium and indium to a material having a basic composition represented by an alkali element:copper:a halogen element=3:2:5.

13 Claims, 7 Drawing Sheets

(51) Int. Cl.
*C09K 11/61* (2006.01)
*G01T 1/20* (2006.01)

(56) References Cited

U.S. PATENT DOCUMENTS

| | | | |
|---|---|---|---|
| 7,482,602 B2 * | 1/2009 | Shoji et al. ................. | 250/483.1 |
| 8,586,931 B2 | 11/2013 | Horie et al. | |
| 8,618,489 B2 | 12/2013 | Ohashi et al. | |
| 8,669,527 B2 | 3/2014 | Ueyama et al. | |
| 2008/0099684 A1 * | 5/2008 | Murakami et al. ........ | 250/361 C |
| 2011/0223323 A1 | 9/2011 | Ohashi et al. | |
| 2013/0026374 A1 | 1/2013 | Saito et al. | |
| 2013/0341512 A1 | 12/2013 | Ohashi et al. | |
| 2014/0084167 A1 | 3/2014 | Ohashi et al. | |

* cited by examiner

SCINTILLATOR MATERIAL AND RADIATION DETECTOR USING SAME

TECHNICAL FIELD

The present invention relates to a scintillator material. In particular, the present invention relates to a scintillator material that converts radiation into visible light and a radiation detector using the same.

BACKGROUND ART

A type of an image detector for radiodiagnosis as currently used is configured to detect an irradiated X rays and thus acquire an X-ray radiograph as a digital signal. This kind of radiation detector can roughly be divided into a direct X-ray detect and/or an indirect X-ray detector. An indirect X-ray detector acquires an image by changing an X ray into visible light by a phosph and/or causing a photoelectric converter such as an amorphous silicon (a-Si) photodiode, single-crystal silicon (c-Si) photodiode, and charge couple device (CCD) to convert the visible light into a charge signal.

When a-Si is used as the photoelectric converter of the indirect X-ray detector, since amorphous silicon has sensitivity in the wavelength band region of 450 nm to 650 nm, the phosphor is required to show luminescence in the wavelength band region of 450 nm to 650 nm. When c-Si is used as the photoelectric converter, since c-Si has sensitivity in the region of a longer wavelength than a-Si, the phosphor is required to show luminescence in the corresponding wavelength band region.

While high luminescence intensity is very important as one of capabilities demanded for a phosphor material, as another aspect, stability for the environment is also an important requirement. More specifically, the stability means characteristics superior in resistivity to deliquescence in which the phosphor material is not dissolved or hardly dissolved by water vapor in the air.

As described in PTL 1, superiority in resistivity to deliquescence of a scintillator material including caesium iodide and copper iodide mixed crystal has been known. PTL 1 describes that the structure represented as $Cs_3Cu_2I_5$ is verified and the scintillator material including caesium iodide and copper iodide mixed crystal emits light having photon energy of 2.8 eV. The mixed crystal has a different crystal structure from that of caesium iodide.

Also as described in PTL 2, it is known that moisture resistance is improved by using a raw material obtained by adding 0.01 mol % of copper iodide and thallium iodide or more as additives to caesium iodide.

CITATION LIST

Patent Literature

PTL 1: Japanese Patent Application Laid-Open No. 2003-147343
PTL 2: Japanese Patent Application Laid-Open No. 2007-205970

SUMMARY OF INVENTION

Technical Problem

As has been described above, further improvement in luminescence intensity is demanded from the scintillator material. Further, if the scintillator material is used for a radiological image detector, as described above, it is important for the scintillator material to have a luminous wavelength suitable for sensitivity characteristics of the photoelectric converter to be used and superior resistivity to deliquescence.

The present invention has been made in view of such background art and provides a scintillator material having improved luminescence intensity.

Solution to Problem

Thus, the present invention provides a scintillator material including a composition having a general formula $Cs_3Cu_2I_5$ and M, wherein M is at least one element or an element group selected from In and Tl. An addition amount of M in moles is represented as larger than 0 mol % and 2 mol % or less with respect to a total sum of cation elements consisting of Cs and Cu.

In another aspect, the present invention provides a scintillator material including a composition having a general formula $[Cs_{1-x}A_x]_3Cu_2I_5$ and M, wherein the general formula satisfies $0 \le x \le 0.2$. A is at least one element or an element group selected from Rb and K. M is at least one element or an element group selected from In and Tl. An addition amount of M in moles is represented as larger than 0 mol % and 2 mol % or less with respect to a total sum of cation elements consisting of Cs, A, and Cu.

In yet another aspect, the present invention provides a scintillator material including a composition having a general formula $Cs_3Cu_2[I_{1-y}Br_y]_5$ and M, wherein the general formula satisfies $0 < y \le 0.6$. M is at least one element or an element group selected from In and Tl. An addition amount of M in moles is represented as larger than 0 mol % and 2 mol % or less with respect to a total sum of cation elements consisting of Cs and Cu.

In still another aspect, the present invention provides a scintillator material including a composition having a general formula $[Cs_{1-x}A_x]_3Cu_2[I_{1-y}Br_y]_5$ and M, wherein the general formula satisfies conditions of $0 < x \le 0.2$ and $0 < y \le 0.6$. A is at least one element or an element group selected from Rb and K. M is at least one element or an element group selected from In and Tl. An addition amount of M in moles is represented as larger than 0 mol % and 2 mol % or less with respect to a total sum of cation elements consisting of Cs, A, and Cu.

In still another aspect, the present invention provides a scintillator material including a composition having a general formula $Cs_3Cu_2[I_{1-y-z}Br_yCl_z]_5$ and M, wherein the general formula satisfies conditions of $0 < y$, $0 \le z$, $0 \le y+z \le 1$, and $4z-y < 3$. However, the conditions $z = 0$ and $0 \le y \le 0.6$ are not simultaneously satisfied. M is at least one element or an element group selected from In and Tl. An addition amount of M in moles is represented as larger than 0 mol % and 2 mol % or less with respect to a total sum of cation elements consisting of Cs and Cu.

In another aspect, the present invention provides a scintillator material including a composition having a general formula $[Cs_{1-x}A_x]_3Cu_2[I_{1-y-z}Br_yCl_z]_5$ and M, wherein the general formula satisfies conditions of $0 < x \le 0.2$, $0 \le y$, $0 \le z$, $0 \le y+z \le 1$, and $4z-y \le 3$. However, the conditions $z=0$ and $0 \le y \le 0.6$ are not simultaneously satisfied. A is at least one element or an element group selected from Rb and K. M is at least one element or an element group selected from In and Tl. An addition amount of M in moles is represented as larger than 0 mol % and 2 mol % or less with respect to a total sum of cation elements consisting of Cs, A, and Cu.

Further, the present invention provides a radiation detector using a scintillator material and a manufacturing method of a scintillator material.

Advantageous Effects of Invention

According to the present invention, a scintillator material with improved luminescence intensity can be provided.

Further features of the present invention will become apparent from the following description of exemplary embodiments with reference to the attached drawings.

DESCRIPTION OF EMBODIMENTS

A scintillator material of the present invention contains a composition configured by ternary elements of: an alkali element such as Cs, Rb, or K; copper; and a halogen element such as I, Br, or Cl, and the material has a basic structure whose composition ratio is represented as alkali element:copper:halogen element=3:2:5, and the composition further contains at least one element or an element group selected from In and Tl. The addition amount of the In and/or Ti in moles is more than 0 mol % and 2 mol % or less with respect to the total sum (1 mol) of cation elements consisting of the alkali element such Cs and Cu.

The scintillator material may contain the composition of the present invention in 90% by weight or more and 100% by weight or less with respect to the total weight and particularly preferably, the whole scintillator material is constituted of the composition in the present invention.

The most basic general formula is represented as $Cs_3Cu_2I_5$ in which the alkali element is Cs and the halogen element is I. M (In and/or Tl) is further contained. This will be described below as a first embodiment. M may be a single element like In or Tl, but it may also be an element group containing both In and Tl.

Another alkali element A (Rb and/or K) may partially substitute for a portion of Cs, which will be described below as a second embodiment. A may be a single element like Rb or K, but it may also be an element group containing both Rb and K.

Another halogen element Br may partially substitute for a portion of I, which will be described below as a third embodiment. As a modification of the third embodiment, also, another alkali element Rb and/or K may partially substitute for a portion of Cs.

At least one halogen element selected from Br and Cl may substitute for a portion or all of I, which will be described below as a fourth embodiment. As a modification of the fourth embodiment, also, another element Rb and/or K may partially substitute for a portion of Cs.

In any of the embodiments described below, the material has the basic structure represented as alkali element:copper:halogen element=3:2:5 and includes characteristics superior in resistivity to deliquescence as a common feature.

In the fifth embodiment, a radiation detector using such scintillator materials will be described.

Thus, improvement in luminescence intensity or improvement in luminescence intensity in consideration of sensitivity of an a-Si or c-Si photodiode photoelectric converter will mainly be described in the following embodiments.

[First Embodiment]

In the present embodiment, a scintillator material capable of shifting the luminous wavelength to the longer wavelength side while increasing luminescence intensity by adding an amount of In or Tl as an additive M to $Cs_3Cu_2I_5$ as a base material will be described in detail. In the present embodiment, the addition amount of In or Tl is represented in moles with respect to the total sum (1 mol) of the cation elements consisting of alkali element such as Cs and Cu. The scintillator material may contain 90% by weight or more and 100% by weight or less of the composition having $Cs_3Cu_2I_5$ and M with respect to the total weight of the scintillator material. The whole scintillator material, particularly preferably, is constituted of $Cs_3Cu_2I_5$ and M.

When used as a detector that acquires an image by converting visible light emitted from a sample into a charge signal by a photoelectric converter such as an amorphous silicon (a-Si) photodiode or single-crystal silicon (c-Si) photodiode, wavelength dependency of sensitivity of a-Si and c-Si becomes important. In this case, an X-ray excited luminescence spectrum preferably matches the above wavelength dependency of sensitivity as much as possible.

Figure 2:
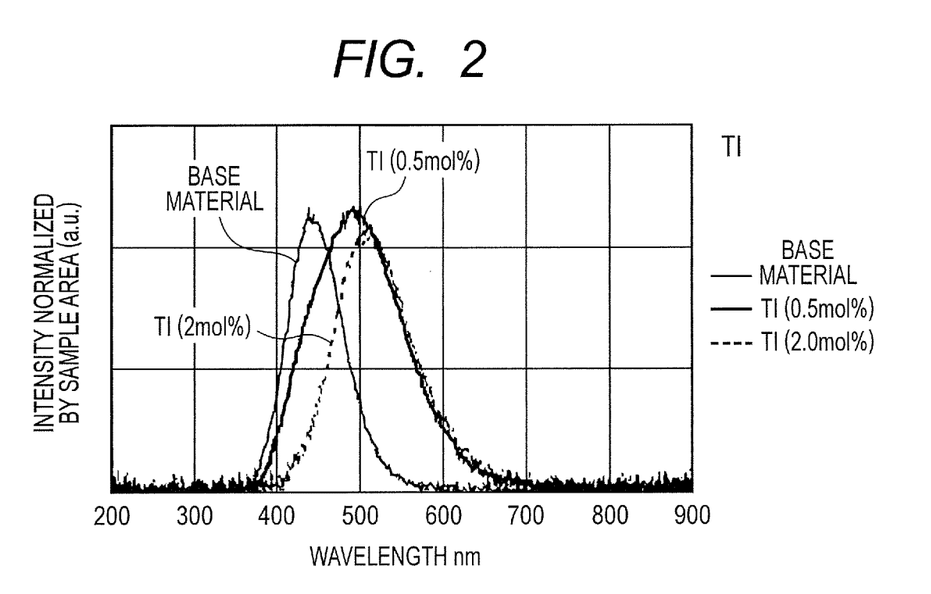
FIG. 2 is a diagram showing the relationship between the addition amount and an X-ray excited luminous wavelength spectrum when Tl is used as the additive in the scintillator material according to Example 1 of the present invention.

FIG. 2 shows the relationship between the addition amount and an X-ray excited luminescence spectrum when Tl is used as the additive. In FIG. 2, a narrow line indicates the X-ray excited luminescence spectrum of $Cs_3Cu_2I_5$ as a base material and a heavy line indicates a case when the addition amount of Tl is 0.5 mol % and a broken line indicates a case when the addition amount of Tl is 2 mol %. Since all cases are normalized by the area of sample, the integral value for the wavelength in FIG. 2 can be compared as luminescence intensity.

Figure 1:
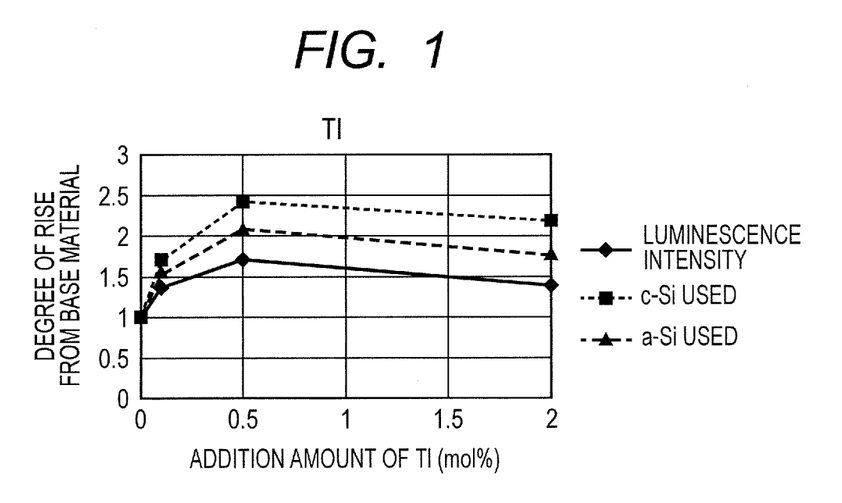
FIG. 1 is a diagram showing a relationship between the addition amount and luminescence intensity when Tl is used as an additive in a scintillator material according to Example 1 of the present invention.

FIG. 1 is a diagram showing the relationship between the addition amount and luminescence intensity when Tl is used as the additive. The lines in FIG. 1 is determined, as described above, as an integral value of the X-ray excited luminescence spectrum and it indicates the X-ray excited luminescence intensity. The X-ray excited luminescence intensity is shown as the degree of rise from the base material normalized by the luminescence intensity of $Cs_3Cu_2I_5$ as the base material.

In FIG. 1, it is evident that the X-ray excited luminescence intensity indicated by the solid line rises above the intensity of the base material when the addition amount of Tl is 2 mol % or less. This indicates that luminescence intensity can be increased by adding an appropriate amount of Tl. The intensity tends to decrease slightly as the addition amount of Tl is 2 mol %. It can be considered to result from the fact that while the crystal is transparent when the addition amount of Tl is small, the crystal exhibits coloring when the addition amount of Tl is 2 mol %. Thus, an upper limit to the addition amount exists and the limit is imposed by a decrease in luminescence intensity caused by coloring. More specifically, it is preferable to set the addition amount to 2 mol % or less.

Figure 5:
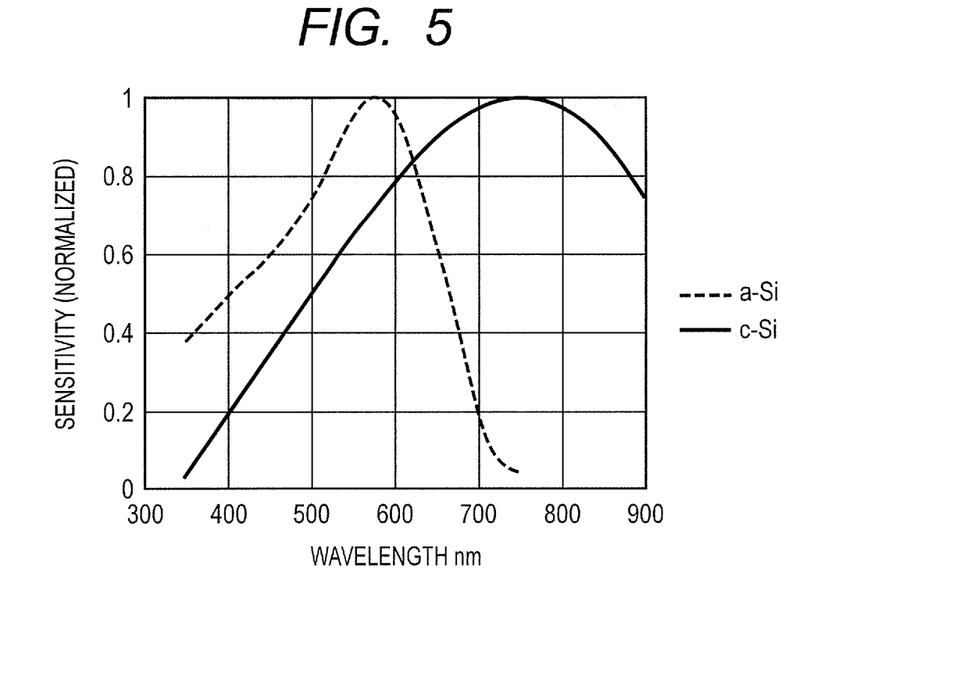
FIG. 5 is a diagram showing wavelength dependency of light-receiving sensitivity of an amorphous silicon (a-Si) photodiode and a single-crystal silicon (c-Si) photodiode.

In FIG. 1, a dotted line indicates luminescence intensity when light-receiving sensitivity of c-Si is taken into consideration. A broken line indicates luminescence intensity when light-receiving sensitivity of a-Si is taken into consideration. The luminescence intensity when light-receiving sensitivity of c-Si or light-receiving sensitivity of a-Si is taken into consideration is a case when the sensitivity showing wavelength dependency shown in FIG. 5 is used and it can be determined as a product of the X-ray excited luminescence spectrum in FIG. 2 and the respective light-receiving sensitivity. The respective luminescence intensity is shown as the degree of rise from the base material normalized by the value of $Cs_3Cu_2I_5$ as the base material.

In FIG. 1, the luminescence intensity indicated by the dotted line (when light-receiving sensitivity of c-Si is taken into consideration) and the luminescence intensity indicated by the broken line (when light-receiving sensitivity of a-Si is taken into consideration) have a higher degree of rise with respect to the base material than the X-ray excited luminescence intensity indicated by the solid line in FIG. 1 and the reason therefor is that the X-ray excited luminescence spectrum is shifted to the longer wavelength side. In this case, it is clear that a still larger charge signal is preferably obtained by combining with a material like c-Si superior in sensitivity in the longer wavelength region to achieve more effect.

The peak is shifted to the longer wavelength side more than the base material by the addition of Tl. In FIG. 2, the peak at the wavelength about 440 nm observed in the base material changes to about 505 nm on the longer wavelength side when the addition amount of Tl is 2 mol %. When the addition amount of Tl is 0.5 mol %, the X-ray excited luminescence intensity reaches the maximum value between the base material and the case when the addition amount of Tl is 2 mol %. The shift of the peak can be interpreted that a peak having the maximum intensity newly appears at about 505 nm with the addition of Tl and a spectrum is formed by the new peak being superimposed on the peak at about 440 nm observed in the base material. When the addition amount of Tl is 2 mol %, the peak at 440 nm observed in the base material almost disappears.

Regarding the lower limit of the addition amount of Tl, an amount that enables luminescence intensity when light-receiving sensitivity of a-Si or c-Si is taken into consideration to exceed the intensity of the base material is enough and, in other words, only an addition that enables luminescence intensity to increase on the longer wavelength side from the peak at about 440 nm is needed.

If Tl is used as the additive, as described above, 0.5 mol % or so is particularly preferable and 2 mol % or less is suitable. If 2 mol % is exceeded, as described above, coloring of the crystal is observed and light transmittance deteriorates, which is not desirable.

Figure 4:
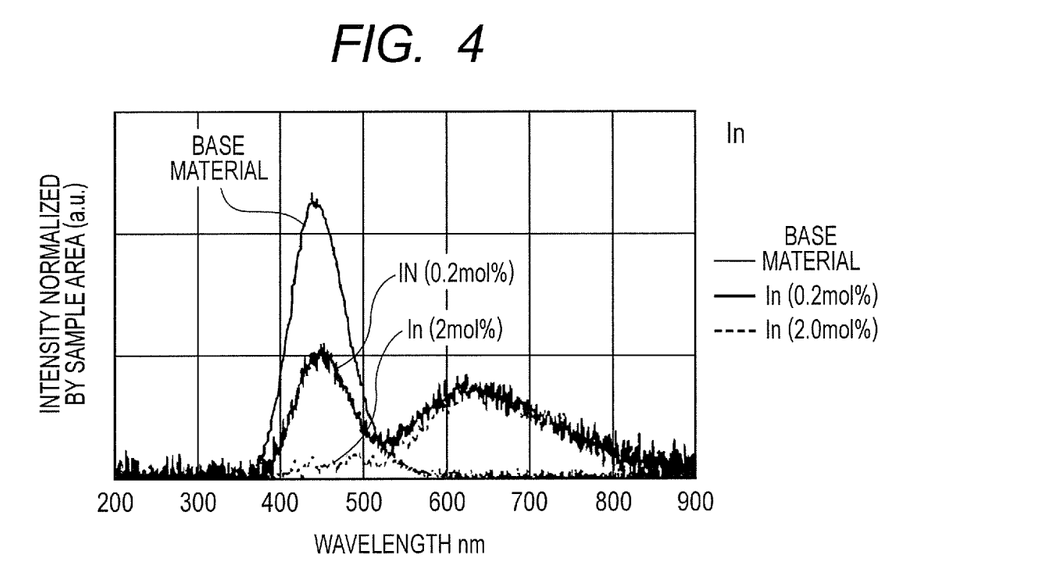
FIG. 4 is a diagram showing the relationship between the addition amount and the X-ray excited luminous wavelength spectrum when In is used as the additive in the scintillator material according to Example 2 of the present invention.

In a case when In is used as the additive, FIG. 4 is a diagram showing the relationship between the addition amount and the X-ray excited luminescence spectrum when In is used as the additive. In FIG. 4, a narrow line indicates the X-ray excited luminescence spectrum of $Cs_3Cu_2I_5$ as the base material and a heavy line indicates a case when the addition amount of In is 0.2 mol % and a broken line indicates a case when the addition amount of In is 2 mol %. Because all cases are normalized by the area of sample, the integral value for the wavelength in FIG. 4 can be compared as luminescence intensity.

Figure 3:
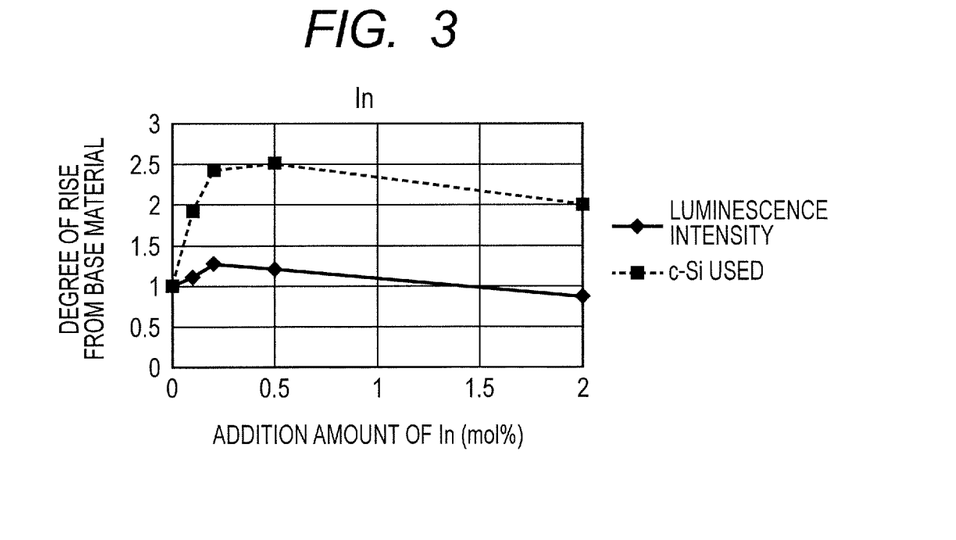
FIG. 3 is a diagram showing the relationship between the addition amount and luminescence intensity when In is used as the additive in the scintillator material according to Example 2 of the present invention.

FIG. 3 is a diagram showing the relationship between the addition amount and luminescence intensity when In is used as the additive. The solid line in FIG. 3 is determined, as described above, as an integral value of the X-ray excited luminescence spectrum and it indicates the X-ray excited luminescence intensity. The X-ray excited luminescence intensity is shown as the degree of rise from the base material normalized by the luminescence intensity of $Cs_3Cu_2I_5$ as the base material.

In FIG. 3, the X-ray excited luminescence intensity indicated by the solid line rises above the intensity of the base material with the addition of In to reach the maximum value when the addition amount of In is 0.2 mol %. This indicates that luminescence intensity can be increased by adding an appropriate amount of In. When the addition amount of In is 0.5 mol % or more, the intensity tends to decrease slightly and this can be considered to result, like the case when Tl is added, from the crystal exhibiting coloring.

In FIG. 3, a dotted line indicates luminescence intensity when light-receiving sensitivity of c-Si is taken into consideration. The luminescence intensity when light-receiving sensitivity of c-Si is taken into consideration is a case when the sensitivity showing wavelength dependency shown in FIG. 5 is used and it can be determined as a product of the X-ray excited luminescence spectrum in FIG. 2 and the light-receiving sensitivity of c-Si. The luminescence intensity when the light-receiving sensitivity of c-Si is taken into consideration is shown as the degree of rise from the base material normalized by the value of $Cs_3Cu_2I_5$ as the base material.

In X-ray excited luminescence spectra in FIG. 4, it is evident that, with the addition of In, a new peak appears on the longer wavelength side than the case of the base material.

While the wavelength of the peak of the base material is about 440 nm, the peak changes to about 640 nm on the longer wavelength side when the addition amount of In is 2 mol %. When the addition amount of In is 0.2 mol %, both peaks of the base material and the case when the addition amount of In is 2 mol % are superimposed and observed. In FIG. 3, the degree of rise of the luminescence intensity when the light-receiving sensitivity of c-Si indicated by the dotted line is extremely larger than the degree of rise of the luminescence intensity indicated by the solid line and this can be attributed to an increase of longer wavelength components of the X-ray excited luminescence spectrum.

When In is used as the additive, as described above, luminescence intensity is located on the still longer wavelength side than when Tl is used and the intensity of the base material can suitably be exceeded by combining with c-Si when the addition amount is 2 mol % or less. If the addition amount exceeds 2 mol %, as described above, coloring of the crystal is markedly observed, which is not preferable.

Regarding the lower limit of the addition amount of In, an amount that enables luminescence intensity when light-receiving sensitivity of c-Si is taken into consideration to exceed the intensity of the base material is enough and, in other words, only an addition that enables luminescence intensity to increase on the longer wavelength side from the peak at about 440 nm is needed.

[Second Embodiment]

The present embodiment is a scintillator material obtained by substituting an alkali element Rb or K for a portion of Cs as an alkali element of $Cs_3Cu_2I_5$ as the base material and adding an amount of In or Tl as an additive and it can be represented by the general formula $[Cs_{1-x}A_x]_3Cu_2I_5$ and M. With this compound, the luminous wavelength can be shifted to the longer wavelength side while luminescence intensity being increased when compared with $Cs_3Cu_2I_5$. In the present embodiment, the addition amount of In or Tl is represented in moles with respect to the total sum (1 mol) of the cation element consisting of Cs, A, and Cu. Details thereof will be described below.

The scintillator material may contain, like the first embodiment, the composition having $[Cs_{1-x}A_x]_3Cu_2I_5$ and M in 90% by weight or more and 100% by weight or less with respect to the total weight of the scintillator material and particularly preferably, the whole scintillator material is constituted of $[Cs_{1-x}A_x]_3Cu_2I_5$ and M. This applies to other embodiments as well.

Figure 6:
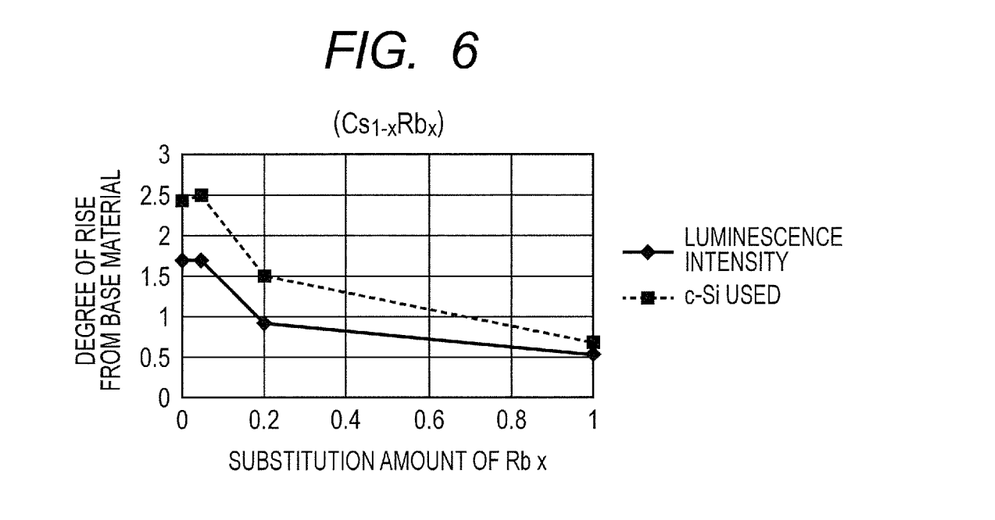
FIG. 6 is a diagram showing the relationship between a substitution amount x of Rb and luminescence intensity when 0.5 mol % of Tl is used as the additive in the scintillator material according to Example 3 of the present invention.

FIG. 6 is a diagram showing the relationship between the substitution amount x of Rb for Cs and luminescence intensity when A=Rb and 0.5 mol % of Tl is added as the additive. In FIG. 6, a solid line indicates the X-ray excited luminescence intensity and a dotted line indicates the luminescence intensity when the light-receiving sensitivity of c-Si is taken into consideration. The luminescence intensities in both cases are shown as the degree of rise from the base material normalized by the luminescence intensity of $Cs_3Cu_2I_5$ as the base material. The composition corresponding to the zero substitution amount of Rb is represented as $Cs_3Cu_2I_5$:Tl (0.5 mol %) obtained by adding Tl (0.5 mol %) to $Cs_3Cu_2I_5$. The composition is not $Cs_3Cu_2I_5$ as the base material. That is, the value of y when x=0 is $y=(Cs_3Cu_2I_5+\text{additive})/(Cs_3Cu_2I_5)$. Thus, it is necessary to note that the value of y intercept is not 1. The light-receiving sensitivity of c-Si is the sensitivity showing wavelength dependency shown in FIG. 5.

Figure 7:
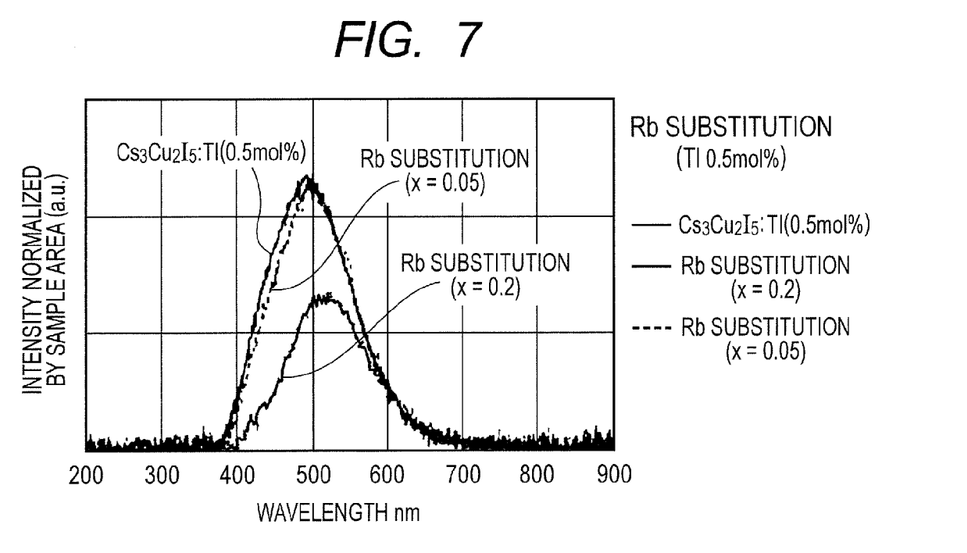
FIG. 7 is a diagram showing the relationship between the substitution amount x of Rb and the X-ray excited luminous wavelength spectrum when 0.5 mol % of Tl is used as the additive in the scintillator material according to Example 3 of the present invention.

FIG. 7 is a diagram showing the relationship between the substitution amount of Rb and the X-ray excited luminescence spectrum. In FIG. 7, a narrow line indicates the X-ray excited luminescence spectrum when there is no substitution of Rb, that is, Tl (0.5 mol %) is added to the $Cs_3Cu_2I_5$, a broken line indicates a case when the substitution amount x of Rb is x=0.05, and a heavy line indicates a case when the substitution amount x of Rb is x=0.2. The integral value for the wavelength in FIG. 7 corresponds to the luminescence intensity indicated by the solid line in FIG. 6. The X-ray excited luminescence spectrum in FIG. 7 when wavelength dependency of the light-receiving sensitivity of c-Si shown in FIG. 5 is taken into consideration corresponds to the luminescence intensity indicated by the dotted line in FIG. 6 when the light-receiving sensitivity of c-Si is taken into consideration.

From FIG. 6, it is evident that the X-ray excited luminescence intensity indicated by the solid line tends to decrease with an increasing substitution amount of Rb. The luminescence intensity when the light-receiving sensitivity of c-Si indicated by the dotted line reaches the maximum value when the substitution amount x is x=0.05, is above the intensity of the base material when x=0.2, tends to decrease when x>0.2, and is below the intensity of the base material when x=1.

In X-ray excited luminescence spectra in FIG. 7, when the substitution amount x of Rb is x=0.05 and 0.2, the position of peak is shifted to the longer wavelength side compared with a case when there is no substitution. Due to the effect of shifting the position of peak to the longer wavelength side by such partial substitution of Rb, the luminescence intensity when the light-receiving sensitivity of c-Si is taken into consideration shows the maximum value when the substitution amount x is x=0.05. Such shifting of the peak position is believed to be caused by changes in crystal, for example, changes of the lattice constant while Rb partially substitutes for a portion of Cs.

Figure 8:
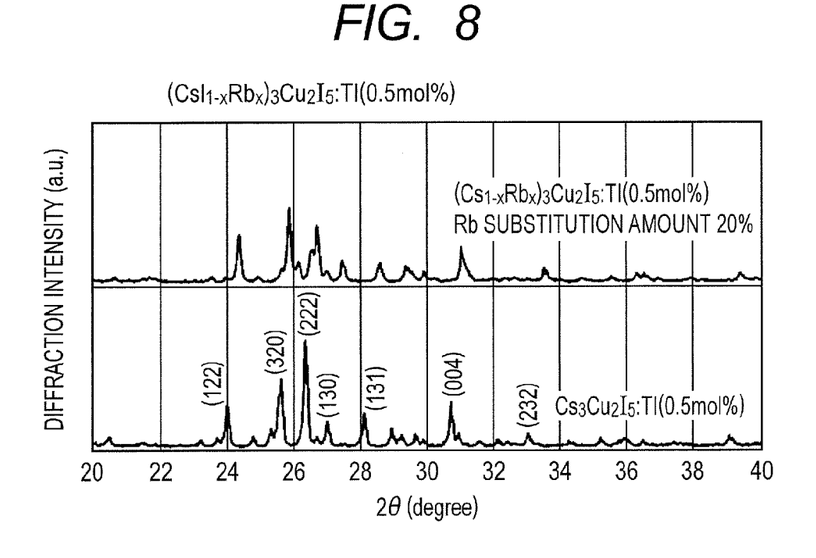
FIG. 8 is a diagram showing X-ray diffraction patterns in the cases where nothing substitutes for Rb and the substitution amount x is x=0.2 when 0.5 mol % of Tl is used as the additive.

FIG. 8 shows X-ray diffraction patterns when there is no substitution of Rb, that is, $Cs_3Cu_2I_5$:Tl (0.5 mol %) and when the substitution amount x of Rb is x=0.2. The crystal structures in both cases belong to the orthorhombic system. In FIG. 8, main plane indices are written for $Cs_3Cu_2I_5$:Tl (0.5 mol %) in which there is no substitution of Rb. From FIG. 8, the peak moves to the wide angle side when the substitution amount x of Rb is x=0.2 and this indicates that the lattice constant changes to a smaller size. This can be considered to be a change caused by partial substitution of Rb having a smaller ion diameter than Cs.

When partially substituting Rb for Cs, as described above, the substitution amount x is most suitably set to x=0.05 or so and x≤0.2 is preferable. If x>0.2, the luminescence intensity significantly decreases and when the light-receiving sensitivity of c-Si is taken into consideration even the luminescence intensity falls below the intensity of the base material in a region of a large substitution amount and is not preferable.

Instead of Rb, the alkali element K may substitute for Cs or the substitution may take the form in which both Rb and K substitute for Cs.

Figure 9:
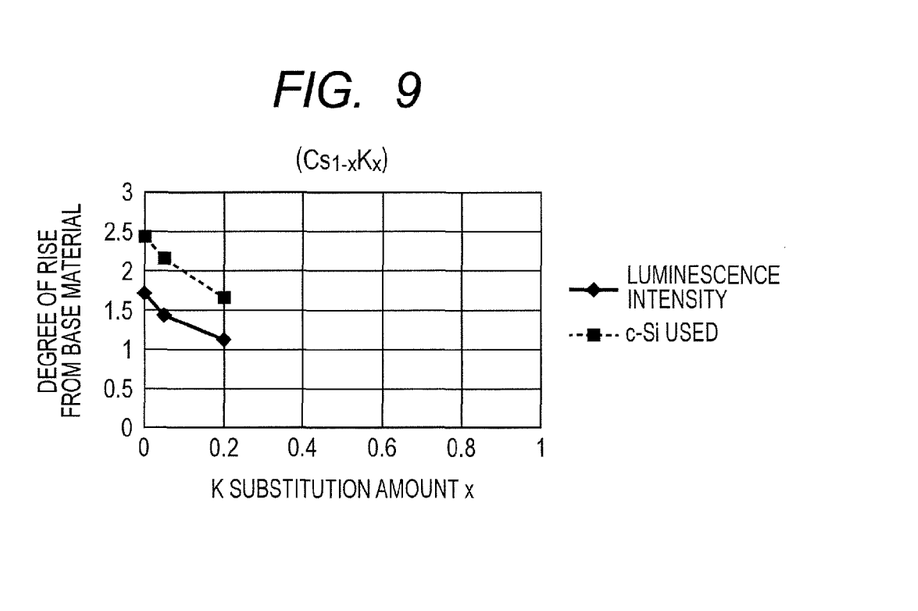
FIG. 9 is a diagram showing the relationship between the substitution amount x of K and luminescence intensity when 0.5 mol % of Tl is used as the additive in the scintillator material according to Example 4 of the present invention.

FIG. 9 is a diagram showing the relationship between the substitution amount x of K for Cs and luminescence intensity when 0.5 mol % of Tl is added as an additive. In FIG. 9, a solid line indicates the X-ray excited luminescence intensity and a dotted line indicates the luminescence intensity when the light-receiving sensitivity of c-Si is taken into consideration. The luminescence intensities in both cases are shown as the degree of rise from the base material normalized by the luminescence intensity of $Cs_3Cu_2I_5$ as the base material. The composition corresponding to the zero substitution amount of K is represented as $Cs_3Cu_2I_5$:(Tl 0.5 mol %) and is not $Cs_3Cu_2I_5$ as the base material. That is, the value of y when x=0 is $y=(Cs_3Cu_2I_5+\text{additive})/(Cs_3Cu_2I_5)$. Thus, it is necessary to note that the value of y intercept is not 1.

Figure 10:
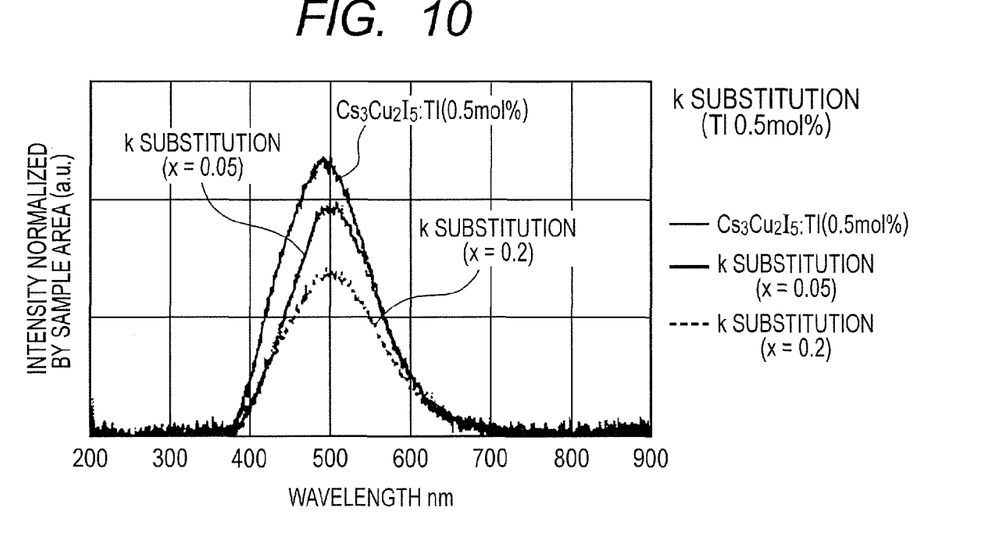
FIG. 10 is a diagram showing the relationship between the substitution amount x of K and the X-ray excited luminous wavelength spectrum when 0.5 mol % of Tl is used as the additive in the scintillator material according to Example 4 of the present invention.

FIG. 10 is a diagram showing the relationship between the substitution amount of K and the X-ray excited luminescence spectrum. In FIG. 10, a narrow line indicates the X-ray excited luminescence spectrum when there is no substitution of K, that is, the luminescence intensity of $Cs_3Cu_2I_5$:Tl (0.5 mol %), a heavy line indicates a case when the substitution amount x of K is x=0.05, and a broken line indicates a case when the substitution amount x of K is x=0.2. The integral value for the wavelength in FIG. 10 corresponds to the luminescence intensity indicated by the solid line in FIG. 9. The X-ray excited luminescence spectrum in FIG. 10 when wavelength dependency of the light-receiving sensitivity of c-Si shown in FIG. 5 is taken into consideration corresponds to the luminescence intensity when the light-receiving sensitivity of c-Si indicated by the dotted line in FIG. 9 is taken into consideration. From FIG. 9, it is evident that the X-ray excited luminescence intensity tends to decrease with an increasing substitution amount of K. From FIG. 10, it is evident that if the substitution amount x of K is x=0.05 and 0.2, the position of peak is slightly shifted to the longer wavelength side compared with a case when there is no substitution. This indicates that, like the partial substitution of Rb, an effect of shifting to the longer wavelength side is obtained also by the partial substitution of K. However, the luminescence intensity when the light-receiving sensitivity of c-Si is taken into consideration also tends to monotonously decrease with an increasing substitution amount and thus, like the partial substitution of Rb, the substitution amount x is preferably x≤0.2 when K partially substitutes for Cs.

[Third Embodiment]

The present embodiment is a compound obtained by substituting a halogen element Br for a portion of I as an halogen element of $Cs_3Cu_2I_5$ as the base material and adding an amount of In or Tl as the additive M and can be represented by the general formula $Cs_3Cu_2[I_{1-y}Br_y]_5$ and M. Accordingly, the luminous wavelength can be shifted to the longer wavelength side while luminescence intensity being increased when compared with $Cs_3Cu_2I_5$. In the present embodiment, the addition amount of In or Tl is represented in moles with respect to the total sum (1 mol) of the cation element consisting of Cs and Cu.

Figure 11:
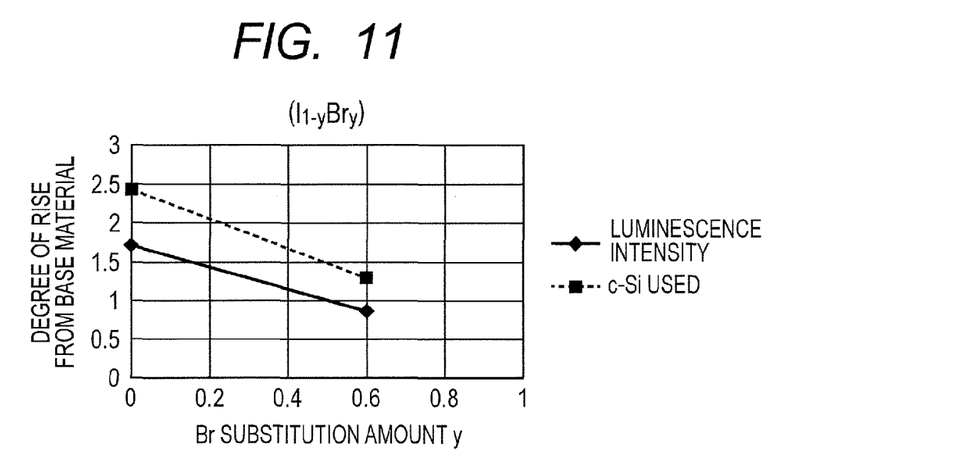
FIG. 11 is a diagram showing the relationship between a substitution amount y of Br and luminescence intensity when 0.5 mol % of Tl is used as the additive in the scintillator material according to Example 5 of the present invention.

FIG. 11 is a diagram showing the relationship between the substitution amount y of Br for I and luminescence intensity when 0.5 mol % of Tl is added as the additive. In FIG. 11, a solid line indicates the X-ray excited luminescence intensity and a dotted line indicates the luminescence intensity when the light-receiving sensitivity of c-Si is taken into consideration. The luminescence intensities in both cases are shown as the degree of rise from the base material normalized by the luminescence intensity of $Cs_3Cu_2I_5$ as the base material. The composition corresponding to the zero substitution amount y of Br is represented as $Cs_3Cu_2I_5$:Tl (0.5 mol %) and it is not $Cs_3Cu_2I_5$ as the base material. That is, the value of y when x=0 is y=($Cs_3Cu_2I_5$+additive)/($Cs_3Cu_2I_5$). Thus, it is necessary to note that the value of y intercept is not 1. The light-receiving sensitivity of c-Si is the sensitivity showing wavelength dependency shown in FIG. 5.

Figure 12:
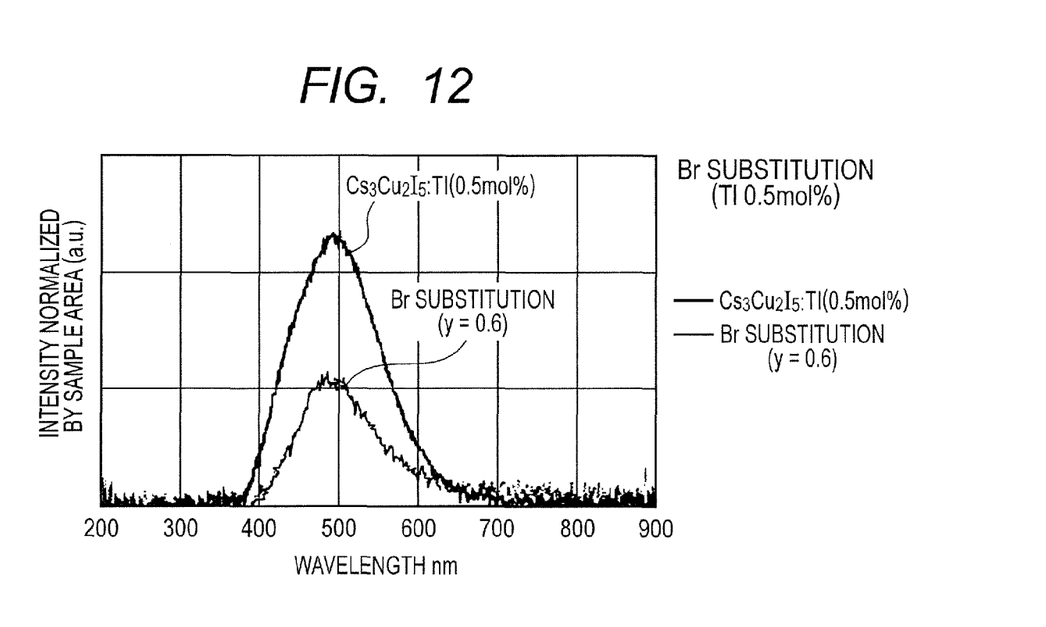
FIG. 12 is a diagram showing the relationship between the substitution amount y of Br and the X-ray excited luminous wavelength spectrum when 0.5 mol % of Tl is used as the additive in the scintillator material according to Example 5 of the present invention.

FIG. 12 is a diagram showing the relationship between the substitution amount of Br and the X-ray excited luminescence spectrum. In FIG. 12, a heavy line indicates the X-ray excited luminescence spectrum when there is no substitution of Br, that is, the luminescence intensity of $Cs_3Cu_2I_5$:Tl (0.5 mol %) and a narrow line indicates a case when the substitution amount y is y=0.6. The integral value for the wavelength in FIG. 12 corresponds to the luminescence intensity indicated by the solid line in FIG. 11. The X-ray excited luminescence spectrum in FIG. 12 when wavelength dependency of the light-receiving sensitivity of c-Si shown in FIG. 5 is taken into consideration corresponds to the luminescence intensity when the light-receiving sensitivity of c-Si indicated by the dotted line in FIG. 11 is taken into consideration. From FIG. 11, it is evident that the X-ray excited luminescence intensity tends to decrease with an increasing substitution amount y of Br. The luminescence intensity when the light-receiving sensitivity of c-Si is taken into consideration also tends to decrease with an increasing substitution amount. However, since the degree of rise from the base material is large in the first place, the intensity when the substitution amount y of Br is y=0.6 is still above the intensity of the base material. In X-ray excited luminescence spectra in FIG. 12, when the substitution amount y of Br is y=0.6, the position of peak hardly changes compared with a case when there is no substitution. This indicates that even if Br partially substitutes for I, the effect of shifting to the longer wavelength side can be maintained. This shows that the halogen element Br may partially substitute for a portion of I in necessary.

Even if Br partially substitutes for I, as described above, the luminescence intensity higher than the luminescence intensity of $Cs_3Cu_2I_5$ as the base material can be obtained and the substitution amount y by which Br partially substitutes for I is preferably y≤0.6.

It is to be noted that an object of the present invention can also be achieved by a compound represented by $[Cs_{1-x}A_x]_3Cu_2[I_{1-y}Br_y]_5$:M combining the partial substitution of Rb or K for Cs of the alkali element described in the second embodiment and the partial substitution of Br for I of the halogen element described in the present embodiment.

[Fourth Embodiment]

The present embodiment is a compound obtained by substituting at least one halogen element selected from Br and Cl for a portion or all of I as a halogen element of $Cs_3Cu_2I_5$ and adding an amount of Tl as the additive M and thus it can be represented by the general formula $Cs_3Cu_2[I_{1-y-z}Br_yCl_z]_5$ and M. Accordingly, light-receiving intensity when the light-receiving sensitivity of c-Si is taken into consideration can be increased compared with a compound ($Cs_3Cu_2[I_{1-y-z}Br_yCl_z]_5$) with an equal substitution amount of the halogen element, but containing no additive. In the present embodiment, the addition amount of In or Tl is represented in moles with respect to the total sum (1 mol) of the cation elements consisting of Cs and Cu. Details thereof will be described below.

Table 1 shows the c-Si light-receiving intensity ratio of X-ray excited luminescence for each compound to which 0.5 mol % of Tl is added as an additive and in which the substitution amount of Br for I is y and the substitution amount of Cl for I is z. The c-Si light-receiving intensity ratio in Table 1 takes the light-receiving sensitivity of c-Si into consideration. The c-Si light-receiving intensity ratio refers the ratio of the c-Si light-receiving intensity of the compound with an equal substitution amount of the halogen element but containing an additive, to the c-Si light-receiving intensity of a compound $Cs_3Cu_2[I_{1-y-z}Br_yCl_z]_5$ containing no additive. The value of the ratio indicates to which extent the c-Si light-receiving intensity is improved with the additive.

TABLE 1

Figure 13:
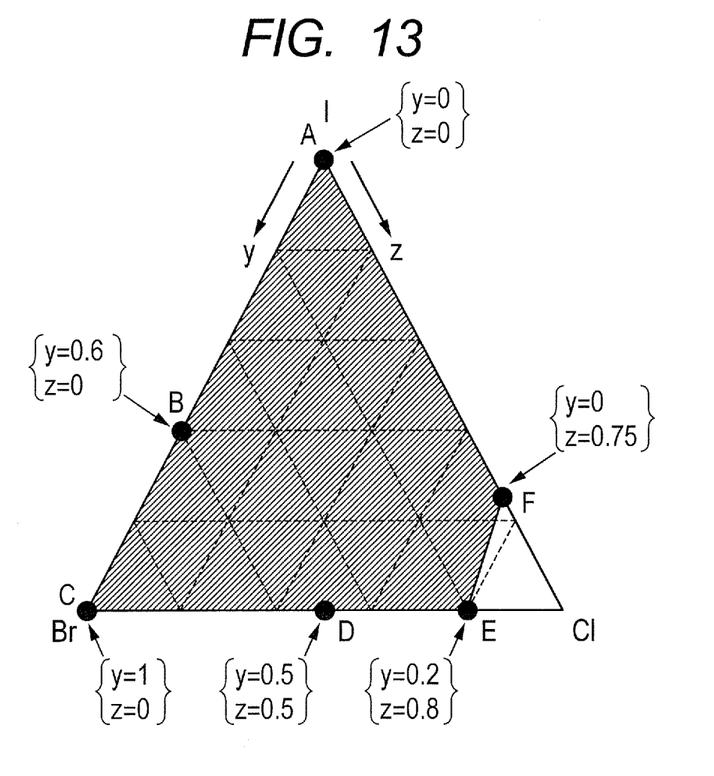
FIG. 13 is a triangular composition diagram by $Cs_3Cu_2I_5$, $Cs_3Cu_2Br_5$, and $Cs_3Cu_2Cl_5$ compositions in the scintillator material according to Example 6 of the present invention.

| Composition | | | | c-Si light-receiving intensity ratio | |
|---|---|---|---|---|---|
| Composition formula (containing 0.5 mol % of additive Tl) | Halogen element substitution amount | | | (compared to no additive containing compositions) | Point of Fig. 13 |
| | 1−y−z | y | z | | |
| $Cs_3Cu_2I_5$ | 1 | 0 | 0 | 1.84 | A |
| $Cs_3Cu_2(I_2Br_3)$ | 0.4 | 0.6 | 0 | 3.53 | B |
| $Cs_3Cu_2Br_5$ | 0 | 1 | 0 | 3.64 | C |

TABLE 1-continued

| Composition | | | c-Si light-receiving intensity ratio | |
|---|---|---|---|---|
| Composition formula (containing 0.5 mol % of additive Tl) | Halogen element substitution amount | | (compared to no additive containing compositions) | Point of Fig. 13 |
| | 1-y-z | y | z | | |
| $Cs_3Cu_2(Br_{2.5}Cl_{2.5})$ | 0 | 0.5 | 0.5 | 1.54 | D |
| $Cs_3Cu_2(Br_1Cl_4)$ | 0 | 0.2 | 0.8 | 2.58 | E |
| $Cs_3Cu_2(I_{1.25}Cl_{3.75})$ | 0.25 | 0 | 0.75 | 1.06 | F |

The c-Si light-receiving intensity ratio exceeds 1 in the range of the substitution amounts z=0 and 0≤y≤1. This indicates that the c-Si light-receiving intensity is increased by the additives in the above range of the substitution amounts.

In the range of the substitution amounts y+z=1 and 0≤z≤0.8, the c-Si light-receiving intensity ratio exceeds 1 as z increases. This indicates that the c-Si light-receiving intensity is increased by the additives in the above range of the substitution amounts.

In the range of the substitution amounts y+z=1 and 0.8≤z≤1, the single crystal of an obtained compound is unstable in the air, which is not preferable.

In the range of the substitution amounts y=0 and 0≤z≤0.75, the c-Si light-receiving intensity ratio tends to decrease as z increases, but still exceeds 1. This indicates that the c-Si light-receiving intensity is increased by the additives in the above range of the substitution amounts.

In the range of the substitution amounts y=0 and 0.75<z≤1, the single crystal of an obtained compound is unstable in the air, which is not preferable.

The composition of a new compound obtained by arbitrarily combining compounds whose c-Si light-receiving intensity ratio exceeds 1 as described above satisfies the following conditions $0 \le y$ and $0 \le z$ and $0 \le y+z \le 1$ and $4z-y \le 3$ for the substitution amounts y or z of the halogen element substitution amounts and can also achieve of the object of the present invention.

FIG. 13 is a triangular composition diagram when each composition of the compounds $Cs_3Cu_2I_5$, $Cs_3Cu_2Br_5$, and $Cs_3Cu_2Cl_5$ is placed at each vertex of a regular triangle.

It is assumed that an additive is contained in all composition regions. Black circles in FIG. 13 indicate composition points shown in table 1 where the c-Si light-receiving intensity ratio exceeds 1. A shaded region in FIG. 13 is a composition region satisfying the above conditions.

it is also to be noted that the object of the present invention can also be achieved by a compound represented by $[Cs_{1-x}A_x]_3Cu_2[I_{1-y-z}Br_yCl_z]_5$:M combining the partial substitution of Rb and/or K for Cs of the alkali element described in the second embodiment and the substitution of Br and/or Cl for I of the halogen element described in the present embodiment.

[Fifth Embodiment]

The present embodiment is characterized by a radiation detect and/or it includes a scintillator material layer using the above-mentioned scintillation materials.

Figure 14:
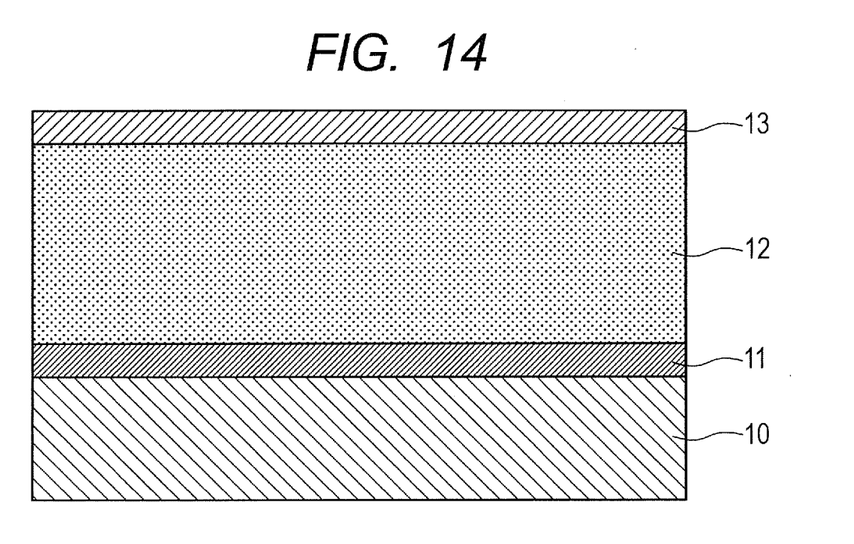
FIG. 14 is a diagram showing the configuration of a radiation detector described in a fifth embodiment.

FIG. 14 is a diagram showing the configuration of a radiation detector. The radiation detector in FIG. 14 is configured by a photo-detection layer 11 containing a photoelectric converter array, a scintillator material layer 12, and a protective layer 13 stacked on one side of a substrate 10 in this order. Between the photo-detection layer 11 and the scintillator material layer 12, a protective layer to prevent degradation of the scintillator material or a light extracting layer to control and pick up scintillation light may be present. In another aspect, a bonding layer to bond the photo-detection layer 11 and the scintillator material layer 12 may be present. A optical material layer to reflect, scatter, or absorb scintillation light may be present on the side of the protective layer 13 opposite to the side in contact with the scintillator material layer 12.

If a radiation enters a radiation detector configured according to the present embodiment, the scintillator material layer 12 absorbs the radiation and emits light in accordance with a luminescence spectrum as shown in FIG. 1. The emission directly enters the photo-detection layer 11 or enters the photo-detection layer 11 after being reflected or scattered by an interface of the protective layer 13 or inside the protective layer 13. The photo-detection layer 11 absorbs a portion or all of the light that has entered the photo-detection layer 11 in accordance with sensitivity thereof to convert the light into a charge signal. With the above process, a radiation detector configured according to the present embodiment can detect radiation.

EXAMPLE 1

The present example is corresponding to the first embodiment to produce a scintillator material represented by $Cs_3Cu_2I_5$:Tl using Tl as the additive for the general formula $Cs_3Cu_2I_5$. Caesium iodide (CsI), copper iodide (CuI), and thallium iodide (TlI) are weighed and mixed to conform to the composition of the general formula $Cs_3Cu_2I_5$:Tl. The addition amount of Tl is controlled by adding and mixing TlI so as to be 0.1 mol %, 0.5 mol %, 2 mol % with respect to the total sum of the cation elements consisting of Cs and Cu. Further, a sample to which no Tl is added is prepared for comparison. The above samples are sealed inside a quartz tube in a vacuum state and then melted at 600° C. for 30 min and after the melting process, melted materials are solidified by decreasing the temperature 20 degrees per hour to produce samples as a scintillator material. Then, samples inside the quartz tube are taken out and each sample is cut into a plate shape of the thickness of about 1 mm. Next, plates are polished and then the area of each plate is measured. Next, the plate is irradiated with X rays substantially perpendicularly to the plate surface to measure the X-ray excited luminescence spectrum. More specifically, an integrating sphere is used and a sample placed inside the integrating sphere is irradiated with X rays to measure excited luminescence by a spectroscope.

FIG. 2 shows X-ray excited luminescence spectra observed from the base material to which no Tl is added and samples to which 0.5 mol % and 2 mol % of Tl are added. Since the intensity of spectra is normalized by the area of the plate surface of each sample in FIG. 2, the value obtained by integration for the wavelength can be considered as X-ray excited luminescence intensity.

FIG. 1 is a diagram showing the relationship between the addition amount and luminescence intensity when Tl is used as the additive. In FIG. 1, the solid line indicates the X-ray excited luminescence intensity and the dotted line indicates the luminescence intensity when the light-receiving sensitivity of c-Si is taken into consideration. The broken line indicates the luminescence intensity when the light-receiving sensitivity of a-Si is taken into consideration. The respective luminescence intensity is shown as the degree of rise from the base material normalized by the luminescence intensity of $Cs_3Cu_2I_5$ as the base material. The light-receiving sensitivity of c-Si and a-Si is sensitivity when the sensitivity showing wavelength dependency shown in FIG. 5 is used.

It is evident from FIG. 1 that the luminescence intensity with the addition of Tl indicated by the solid line becomes larger than the intensity of the base material. Exceedingly larger output than the base material can be obtained from both of the luminescence intensity when the light-receiving sensitivity indicated by the dotted line where c-Si is taken into consideration and the luminescence intensity when the light-receiving sensitivity indicated by the broken line where a-Si is taken into consideration. This is because, as shown in FIG. 2, the intensity on the longer wavelength side increases more than $Cs_3Cu_2I_5$ as the base material.

From the above results, it is clear that if the addition amount of Tl is 2% or less, all of the X-ray excited luminescence intensity, the luminescence intensity when the light-receiving sensitivity of c-Si is taken into consideration, and the luminescence intensity when the light-receiving sensitivity of a-Si is taken into consideration exceeds the luminescence intensity of $Cs_3Cu_2I_5$ as the base material.

From these results, it is evident that when Tl is used as the additive, 0.5 mol % or so is particularly preferable and 2 mol % or less is suitable. If 2 mol % is exceeded, coloring of the crystal becomes marked and light transmittance deteriorates, which is not desirable.

Subsequently, stability of samples in the air in the present example is examined.

More specifically, samples are left in the air for three months and then, the samples are compared before and after being left to check for any change in shape and changes in luminescence intensity. As a result, no marked change in shape is observed and no significant difference indicating degradation over time in luminescence intensity is found. This indicates that scintillator materials in the present invention are superior in resistivity to deliquescence.

EXAMPLE 2

The present example is corresponding to the first embodiment to produce a scintillator material represented by $Cs_3Cu_2I_5$:In using In as the additive for the general formula $Cs_3Cu_2I_5$. Caesium iodide (CsI), copper iodide (CuI), and indium iodide (InI) are weighed and mixed to conform to the composition of the general formula $Cs_3Cu_2I_5$:In. The addition amount of In is controlled by adding and mixing InI so as to be 0.1 mol %, 0.2 mol %, 0.5 mol %, 2 mol % with respect to the total sum of the cation elements consisting of Cs and Cu. The above samples are sealed inside a quartz tube in a vacuum state and then melted at 600° C. for 30 min and thereafter, melted materials are solidified by decreasing the temperature 20 degrees per hour to produce samples. Then, samples inside the quartz tube are taken out and each sample is cut into a plate shape of the thickness of about 1 mm. Next, plates are polished and then the area of each plate is measured. Next, the plate is irradiated with X rays substantially perpendicularly to the plate surface to measure the X-ray excited luminescence spectrum. More specifically, an integrating sphere is used and a sample placed inside the integrating sphere is irradiated with X rays to measure excited luminescence by a spectroscope.

FIG. 4 shows X-ray excited luminescence spectra observed from the base material to which no In is added and samples to which 0.2 mol % and 2 mol % of In are added. The base material to which no In is added is the same as the base material in Example 1. Since the intensity of spectra is normalized by the area of the plate surface of each sample in FIG. 4, the value obtained by integration for the wavelength can be considered as X-ray excited luminescence intensity.

FIG. 3 is a diagram showing the relationship between the addition amount and luminescence intensity when In is used as the additive. In FIG. 3, the solid line indicates the X-ray excited luminescence intensity and the dotted line indicates the luminescence intensity when the light-receiving sensitivity of c-Si is taken into consideration.

It is evident from FIG. 3 that the X-ray excited luminescence intensity indicated by the solid line becomes larger than the intensity of the base material in the range of 0.5 mol % or less with the addition of In. More specifically, the X-ray excited luminescence intensity reaches the maximum value when the addition amount of In is 0.2 mol %, tends to slightly decrease when the addition amount of In is more than 0.2 mol %, and it is below the intensity of $Cs_3Cu_2I_5$ as the base material when the addition amount of In is 2 mol %. However, as shown in FIG. 4, the intensity on the longer wavelength side is higher than the intensity of $Cs_3Cu_2I_5$ as the base material at the luminous wavelength and thus, the output of the c-Si sensor is improved. As a result, the luminescence intensity when the light-receiving sensitivity indicated by the dotted line in FIG. 3 where c-Si is taken into consideration reaches the maximum value when the addition amount of In is 0.5 mol % and exceedingly larger output than the base material can be obtained when the addition amount of In is 2 mol % or less.

When In is used as the additive, as described above, 0.2 mol % to 0.5 mol % or so is particularly preferable and 2 mol % or less is suitable. If 2 mol % is exceeded, coloring of the crystal becomes marked and light transmittance deteriorates, which is not desirable.

Subsequently, stability of samples in the present example is examined.

More specifically, samples are left in the air for three months and then, the samples are compared before and after being left to check for any change in shape and changes in luminescence intensity. As a result, no marked change in shape is observed and no significant difference indicating degradation over time in luminescence intensity is found. This indicates that scintillator materials in the present invention are superior in resistivity to deliquescence.

EXAMPLE 3

The present example is corresponding to the second embodiment to produce a scintillator material by substituting an alkali element Rb for a portion of Cs as the alkali element of $Cs_3Cu_2I_5$ as the base material and adding Tl as the additive. The general formula thereof is represented as $[Cs_{1-x}Rb_x]_3Cu_2I_5$:Tl and the addition amount of Tl is set to 0.5 mol % with respect to the total sum of the cation elements consisting of Cs and Rb as the alkali element and Cu.

Caesium iodide (CsI), rubidium iodide (RbI), copper iodide (CuI), and thallium iodide (TlI) are weighed and mixed to conform to the composition of the general formula $[Cs_{1-x}Rb_x]_3Cu_2I_5$:Tl. Tl is added and mixed so that the substitution amount x of Rb is x=0.05, 0.2, 1.0 while the addition amount of Tl is fixed to 0.5 mol % with respect to the total sum of the cation elements consisting of Cs and Rb as the alkali element and Cu. Further, the above samples are sealed inside a quartz tube in a vacuum state and then melted at 600° C. for 30 min and thereafter, melted materials are solidified by decreasing the temperature 20 degrees per hour to produce samples.

Then, samples inside the quartz tube are taken out and each sample is cut into a plate shape of the thickness of about 1 mm and the polished to measure the area of each plate surface. Then, the plate is irradiated with X rays substantially perpendicularly to the plate surface to measure the X-ray excited luminescence spectrum. More specifically, an integrating sphere is used and a sample placed inside the integrating sphere is irradiated with X rays to measure excited luminescence by a spectroscope.

FIG. 7 shows X-ray excited luminescence spectra observed from $Cs_3Cu_2I_5$:Tl in which there is no substitution of Rb and samples whose substitution amount x of Rb is x=0.05, 0.2. $Cs_3Cu_2I_5$:Tl in which there is no substitution of Rb is the same as the base material in Example 1. Since the intensity of spectra is normalized by the area of the plate surface of each sample in FIG. 7, the value obtained by integration for the wavelength can be considered as X-ray excited luminescence intensity.

FIG. 6 is a diagram showing the relationship between the substitution amount x of Rb and luminescence intensity when Tl is used as the additive. In FIG. 6, the solid line indicates the X-ray excited luminescence intensity and the dotted line indicates the luminescence intensity when the light-receiving sensitivity of c-Si is taken into consideration.

It is evident from FIG. 6 that the luminescence intensity indicated by the solid line is larger than 1 and above the intensity of $Cs_3Cu_2I_5$ as the base material when the substitution amount x of Rb is x=0.05. When the substitution amount x of Rb is x≥0.2, the luminescence intensity is below the intensity of $Cs_3Cu_2I_5$ as the base material. However, as shown in FIG. 7, the intensity on the longer wavelength side is higher than the intensity of $Cs_3Cu_2I_5$ as the base material and in addition, the intensity is further shifted to the longer wavelength side than $Cs_3Cu_2I_5$:Tl in which there is no substitution of Rb and thus, the output of the c-Si sensor may be improved. As a result, the luminescence intensity when the light-receiving sensitivity indicated by the dotted line in FIG. 6 where c-Si is taken into consideration reaches the maximum value when the substitution amount x of Rb is x=0.05 and the output is larger than that of the base material in the range of x≤0.2. From the above result, the substitution amount x of Rb is particularly preferably x=0.05 and x≤0.2 is suitable.

Subsequently, stability of samples in the air in the present example is examined.

More specifically, samples are left in the air for three months and then, the samples are compared before and after being left to check for any change in shape and changes in luminescence intensity. As a result, no marked change in shape is observed and no significant difference indicating degradation over time in luminescence intensity is found. This indicates that scintillator materials in the present invention are superior in resistivity to deliquescence.

EXAMPLE 4

The present example is corresponding to the second embodiment to produce a scintillator material by substituting an alkali element K for a portion of Cs as the alkali element of $Cs_3Cu_2I_5$ as the base material and adding Tl as the additive. The general formula thereof is represented as $[Cs_{1-x}K_x]_3Cu_2I_5$:Tl and the addition amount of Tl is set to 0.5 mol % with respect to the total sum of the cation elements consisting of Cs and K as the alkali element and Cu.

Caesium iodide (CsI), potassium iodide (KI), copper iodide (CuI), and thallium iodide (TlI) are weighed and mixed to conform to the composition of the general formula $[Cs_{1-x}K_x]_3Cu_2I_5$:Tl. Tl is added and mixed so that the substitution amount x of K is x=0.05, 0.2 while the addition amount of Tl is fixed to 0.5 mol % with respect to the total sum of the cation elements consisting of Cs and K as the alkali element and Cu. The above samples are sealed inside a quartz tube in a vacuum state and then melted at 600° C. for 30 min and thereafter, melted materials are solidified by decreasing the temperature 20 degrees per hour to produce samples.

Then, samples inside the quartz tube are taken out and each sample is cut into a plate shape of the thickness of about 1 mm and then polished to measure the area of each plate surface. Then, the plate is irradiated with X rays substantially perpendicularly to the plate surface to measure the X-ray excited luminescence spectrum. More specifically, an integrating sphere is used and a sample placed inside the integrating sphere is irradiated with X rays to measure excited luminescence by a spectroscope.

FIG. 10 shows X-ray excited luminescence spectra observed from $Cs_3Cu_2I_5$:Tl in which there is no substitution of K and samples whose substitution amount x of K is x=0.05, 0.2. $Cs_3Cu_2I_5$:Tl in which there is no substitution of K is the same as the base material in Example 1. Since the intensity of spectra is normalized by the area of the plate surface of each sample in FIG. 10, the value obtained by integration for the wavelength can be considered as X-ray excited luminescence intensity.

FIG. 9 is a diagram showing the relationship between the substitution amount of K and luminescence intensity when Tl is used as the additive. In FIG. 9, the solid line indicates the X-ray excited luminescence intensity and the dotted line indicates the luminescence intensity when the light-receiving sensitivity of c-Si is taken into consideration.

It is evident from FIG. 9 that the X-ray excited luminescence intensity indicated by the solid line is larger than the intensity of $Cs_3Cu_2I_5$ as the base material when the substitution amount x of K is x≤0.2.

As shown in FIG. 10, the scintillator material in the present embodiment has higher intensity on the longer wavelength side than $Cs_3Cu_2I_5$ as the base material. Though almost no shift to the longer wavelength side is observed when compared with $Cs_3Cu_2I_5$:Tl in which there is no substitution of K, the output of the c-Si sensor is improved when compared with the base material. As a result, the output is larger than that of the base material in the range of x≤0.2. From the above result, the substitution amount x of K is suitably x≤0.2.

Subsequently, stability of samples in the air in the present example is examined.

More specifically, samples are left in the air for three months and then, the samples are compared before and after being left to check for any change in shape and changes in luminescence intensity. As a result, no marked change in shape is observed and no significant difference indicating degradation over time in luminescence intensity is found. This indicates that scintillator materials in the present invention are superior in resistivity to deliquescence.

EXAMPLE 5

The present example is corresponding to the third embodiment to produce a scintillator material by substituting a halogen element Br for a portion of I as the halogen element of $Cs_3Cu_2I_5$ as the base material and adding Tl as the additive. The general formula thereof is represented as $Cs_3Cu_2[I_{1-y}Br_y]_5$:Tl and the addition amount of Tl is set to 0.5 mol % with respect to the total sum of the cation elements consisting of Cs and Cu.

Caesium iodide (CsI), copper bromide (CuBr), and thallium iodide (TlI) are weighed and mixed to conform to the composition of the general formula $Cs_3Cu_2[I_{1-y}Br_y]_5:M$. Tl is added and mixed so that the substitution amount y of Br is y=0.6 while the addition amount of Tl is fixed to 0.5 mol % with respect to the total sum of the cation elements consisting of Cs and Cu. The above samples are sealed inside a quartz tube in a vacuum state and then melted at 600° C. for 30 min and thereafter, melted materials are solidified by decreasing the temperature 20 degrees per hour to produce samples.

Then, samples inside the quartz tube are taken out and each sample is cut into a plate shape of the thickness of about 1 mm and then polished to measure the area of each plate surface. Then, the plate is irradiated with X rays substantially perpendicularly to the plate surface to measure the X-ray excited luminescence spectrum. More specifically, an integrating sphere is used and a sample placed inside the integrating sphere is irradiated with X rays to measure excited luminescence by a spectroscope.

FIG. 12 shows X-ray excited luminescence spectra observed from $Cs_3Cu_2I_5$:Tl in which there is no substitution of Br and samples whose substitution amount y of Br is y=0.6. $Cs_3Cu_2I_5$:Tl in which there is no substitution of Br is the same as the base material in Example 1. Since the intensity of spectra is normalized by the area of the plate surface of each sample in FIG. 12, the value obtained by integration for the wavelength can be considered as X-ray excited luminescence intensity.

FIG. 11 is a diagram showing the relationship between the substitution amount of Br and luminescence intensity when Tl is used as the additive. In FIG. 11, the solid line indicates the X-ray excited luminescence intensity and the dotted line indicates the luminescence intensity when the light-receiving sensitivity of c-Si is taken into consideration.

It is evident from FIG. 11 that the luminescence intensity indicated by the solid line is smaller than the intensity of $Cs_3Cu_2I_5$ as the base material when the substitution amount y of Br is y=0.6.

However, as shown in FIG. 12, the scintillator material in the present embodiment has higher intensity on the longer wavelength side than $Cs_3Cu_2I_5$ as the base material. Though no shift to the longer wavelength side is observed when compared with $Cs_3Cu_2I_5$:Tl in which there is no substitution of Br, the output of the c-Si sensor is improved when compared with the base material. As a result, the output is larger than that of the base material when the substitution amount y of Br is y=0.6. From the above result, the proper range of the substitution amount y of Br is y≤0.6.

Subsequently, stability of samples in the air in the present example is examined.

More specifically, samples are left in the air for three months and then, the samples are compared before and after being left to check for any change in shape and changes in luminescence intensity. As a result, no marked change in shape is observed and no significant difference indicating degradation over time in luminescence intensity is found. This indicates that scintillator materials in the present invention are superior in resistivity to deliquescence.

EXAMPLE 6

The present example is corresponding to the fourth embodiment to produce a scintillator material by substituting halogen element Br or Cl for a portion or all of I as the halogen element of $Cs_3Cu_2I_5$ as the base material and adding Tl as the additive. The general formula thereof is represented as $Cs_3Cu_2[I_{1-y-z}Br_yCl_z]_5$:Tl and the addition amount of Tl is set to 0.5 mol % with respect to the total sum of the cation elements consisting of Cs and Cu.

Raw material powders arbitrarily selected from caesium iodide (CsI), caesium bromide (CsBr), caesium chloride (CsCl), copper iodide (CuI), copper bromide (CuBr), copper chloride (CuCl), thallium iodide (TlI), and thallium bromide (TlBr) are weighed and mixed to conform to the composition of the general formula $Cs_3Cu_2[I_{1-y-z}Br_yCl_z]_5$:Tl. Tl is added and mixed so that (substitution amount y of Br:substitution amount z of Cl) are (0:0), (0.6:0), (1:0), (0.5:0.5), (0.2:0.8), or (0:0.75) while the addition amount of Tl is fixed to two levels of 0 mol % and 0.5 mol % with respect to the total sum of the cation elements consisting of Cs and Cu. The above mixed powder samples are sealed inside a quartz tube in a vacuum state and then melted at 600° C. for 30 min and thereafter, melted materials are solidified by decreasing the temperature 20 degrees per hour to produce samples.

Mixed powders of compounds in which coloring in the solidified samples are purified in advance. More specifically, the mixed power sample is melted while a vacuum atmosphere of 0.1 Pa or less and is continuously heated for one hour or longer while a melt state is maintained and then, the sample is once cooled and solidified. A coloring portion is removed from the obtained solidified material, and the remaining portion is pulverized and sealed in a quartz tube using the pulverized portion to produce samples as described above.

Then, samples inside the quartz tube are taken out and each sample is cut into a plate shape of the thickness of about 1 mm and then polished to measure the area of each plate surface. Then, the plate is irradiated with X rays substantially perpendicularly to the plate surface to measure the X-ray excited luminescence spectrum. More specifically, an integrating sphere is used and a sample placed inside the integrating sphere is irradiated with X rays to measure excited luminescence by a spectroscope. Table 1 shows the c-Si light-receiving intensity ratio by X-ray excitation of each sample. The c-Si light-receiving intensity ratio takes the light-receiving sensitivity of c-Si into consideration. The c-Si light-receiving intensity ratio is the ratio of the c-Si light-receiving intensity of a compound with an equal substitution amount of the halogen element, but containing 0.5 mol % of Tl as an additive to the c-Si light-receiving intensity of a compound containing no additive M. The value of the ratio indicates to which extent the c-Si light-receiving intensity is improved with the additive.

The light-receiving intensity ratio exceeds 1 in the range of the substitution amounts z=0 and 0≤y≤1.

In the range of the substitution amounts y+z=1 and 0≤z≤0.8, the light-receiving intensity ratio exceeds 1 as z increases, though the light-receiving intensity ratio tends to decrease.

In the range of the substitution amounts y=0 and 0≤z≤0.75, the c-Si light-receiving intensity ratio tends to decrease as z increases, but exceeds 1.

Subsequently, stability of samples in the air in the present example is examined.

More specifically, samples are left in the air for three months and then, the samples are compared before and after being left to check for any change in shape and changes in luminescence intensity. As a result, no marked change in shape is observed and no significant difference indicating degradation over time in luminescence intensity is found. This indicates that scintillator materials in the present invention are superior in resistivity to deliquescence.

EXAMPLE 7

The present example is corresponding to the fifth embodiment. The plate-shaped single crystal by each compound produced in each of Example 1 to Example 6 is used for a scintillator material layer. The scintillator material is bonded onto the light-receiving surface of a CCD photo-detector in which a photo-detection layer containing an a-Si photoelectric converter array and a substrate are integrated by using a double-coated adhesive sheet. Further, an aluminum reflection film is bonded onto the scintillator material layer by using a double-coated adhesive protective film sheet to produce a radiation detector. When X rays are caused to enter the radiation detector via an X-ray chart and image data is extracted from the radiation detector, bright and dark lines reflecting the shape of the X-ray chart can be confirmed. This shows effectiveness of the fifth embodiment of the present invention.

Industrial Applicability

A scintillator material according to the present invention is caused to emit visible light by radiation and is useful as a radiation detector by using in combination with a photo-detector that acquires an image by causing a photoelectric converter such as an amorphous silicon (a-Si) photodiode or single-crystal silicon (c-Si) photodiode to convert the visible light into a charge signal. Particularly, the scintillator material can be used for medical, industrial, high-energy physics, and space measuring devices using radiation such as X rays.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-126263, filed Jun. 6, 2011, which is hereby incorporated by reference herein in its entirety.

REFERENCE SIGNS LIST

10 Substrate
11 Photo-detection layer
12 Scintillator material layer
13 Protective layer

The invention claimed is:

1. A scintillator material comprising a composition having a general formula $[Cs_{1-x}A_x]_3Cu_2[I_{1-y}Br_y]_5$ and M,
   wherein:
   the general formula satisfies conditions of $0 \leq x \leq 0.2$ and $0 \leq y \leq 0.6$,
   A is at least one element or an element group selected from Rb and K,
   M is at least one element or an element group selected from In and Tl, and
   an addition amount of M in moles is represented as larger than 0 mol % and 2 mol % or less with respect to a total sum of elements consisting of Cs, A, and Cu.

2. The scintillator material according to claim 1, wherein $y=0$.

3. The scintillator material according to claim 1, wherein $x=0$.

4. The scintillator material according to claim 1, wherein the material contains the composition at 90% by weight or more and 100% by weight or less of a total weight.

5. The scintillator material according to claim 1, wherein the material consists of the composition.

6. A radiation detector provided with the scintillator material according to claim 1 on a photo-detection layer.

7. The radiation detector according to claim 6, wherein the photo-detection layer includes a photoelectric converter array.

8. A scintillator material comprising a composition having a general formula $[Cs_{1-x}A_x]_3Cu_2[I_{1-y-z}Br_yCl_z]_5$ and M,
   wherein:
   the general formula satisfies conditions of $0 \leq x \leq 0.2$, $0 \leq y$, $0 \leq z$, $0 \leq y+z \leq 1$, and $4z-y \leq 3$, in which conditions $z=0$ and $0 \leq y \leq 0.6$ are not simultaneously satisfied,
   A is at least one element or an element group selected from Rb and K,
   M is at least one element selected or an element group from In and Tl, and
   an addition amount of M in moles is represented as larger than 0 mol % and 2 mol % or less with respect to a total sum of elements consisting of Cs, A, and Cu.

9. The scintillator material according to claim 8, wherein $x=0$.

10. The scintillator material according to claim 8, wherein the material contains the composition at 90% by weight or more and 100% by weight or less of a total weight.

11. The scintillator material according to claim 8, wherein the material consists of the composition.

12. A radiation detector provided with the scintillator material according to claim 8 on a photo-detection layer.

13. The radiation detector according to claim 12, wherein the photo-detection layer includes a photoelectric converter array.

* * * * *